United States Patent
Tachibana et al.

(10) Patent No.: US 10,522,817 B2
(45) Date of Patent: Dec. 31, 2019

(54) CATHODE MATERIAL, NON-AQUEOUS ELECTROLYTE SECONDARY BATTERY CATHODE, AND NON-AQUEOUS ELECTROLYTE SECONDARY BATTERY

(71) Applicant: DENSO CORPORATION, Kariya, Aichi-pref. (JP)

(72) Inventors: Yuki Tachibana, Kariya (JP); Yoshinori Satou, Kariya (JP); Nobuo Yamamoto, Kariya (JP); Shigeki Komine, Kariya (JP); Yuta Shimonishi, Kariya (JP)

(73) Assignee: DENSO CORPORATION, Kariya (JP)

( * ) Notice: Subject to any disclaimer, the term of this patent is extended or adjusted under 35 U.S.C. 154(b) by 279 days.

(21) Appl. No.: 15/522,734

(22) PCT Filed: Mar. 10, 2016

(86) PCT No.: PCT/JP2016/001318
§ 371 (c)(1),
(2) Date: Apr. 27, 2017

(87) PCT Pub. No.: WO2016/157745
PCT Pub. Date: Oct. 6, 2016

(65) Prior Publication Data
US 2017/0331101 A1    Nov. 16, 2017

(30) Foreign Application Priority Data

Mar. 31, 2015 (JP) .................................. 2015-071637

(51) Int. Cl.
*H01M 10/0525* (2010.01)
*H01M 4/131* (2010.01)

(52) U.S. Cl.
CPC ....... *H01M 4/131* (2013.01); *H01M 10/0525* (2013.01)

(58) Field of Classification Search
None
See application file for complete search history.

(56) References Cited

U.S. PATENT DOCUMENTS 8,734,994 B2    5/2014 Park et al.
2001/0024753 A1  9/2001 Munakata et al.
(Continued)

FOREIGN PATENT DOCUMENTS

| JP | 2002145623 A | * | 5/2002 |
| JP | 2006-202702 A | | 8/2006 |
| JP | 2007-188703 A | | 7/2007 |

OTHER PUBLICATIONS

JP2002145623A—machine translation (Year: 2002).*
(Continued)

*Primary Examiner* — Haroon S. Sheikh
(74) *Attorney, Agent, or Firm* — Oliff PLC

(57) ABSTRACT

A positive electrode material includes: $Li_2Ni_\alpha M^1_\beta M^2_\gamma Mn_\eta O_{4-\varepsilon}$. $\alpha$ satisfies a relational expression of $0.50 < \alpha \leq 1.33$. $\gamma$ satisfies a relational expression of $0.33 \leq \gamma \leq 1.1$. $\eta$ satisfies a relational expression of $0 \leq \eta \leq 1.00$. $\beta$ satisfies a relational expression of $0 \leq \beta < 0.67$. $\varepsilon$ satisfies a relational expression of $0 \leq \varepsilon \leq 1.00$. $M^1$ is at least one type selected from Co and Ga. $M^2$ is at least one type selected from Ge, Sn, and Sb. $Li_2Ni_\alpha M^1_\beta M^2_\gamma Mn_\eta O_{4-\varepsilon}$ has a layered structure which includes a Li layer and a Ni layer. A crystal structure of $Li_2Ni_\alpha M^1_\beta M^2_\gamma Mn_\eta O_{4-\varepsilon}$ is a superlattice structure.

12 Claims, 4 Drawing Sheets

(56) References Cited

U.S. PATENT DOCUMENTS

| | | |
|---|---|---|
| 2002/0012842 A1 | 1/2002 | Tsujimoto et al. |
| 2003/0013017 A1 | 1/2003 | Nagayama et al. |
| 2005/0191551 A1 | 9/2005 | Tsujimoto et al. |
| 2008/0116418 A1 | 5/2008 | Tabuchi et al. |
| 2009/0117469 A1* | 5/2009 | Hiratsuka ............ H01M 4/366 429/231.8 |
| 2014/0038043 A1 | 2/2014 | Hirayama et al. |
| 2014/0363708 A1* | 12/2014 | Ito ...................... H01M 2/1235 429/56 |

OTHER PUBLICATIONS

Myung et al., "Synthesis of LiNi0.5Mn0.5—xTixO2 by an Emulsion Drying Method and Effect of Ti on structure and Electrochemical Properties," Chem. Mater., 2005, vol. 17, pp. 2427-2435.

Dominko, R., "Li2MSiO4 (M=Fe and/or Mn) cathode materials," Journal of Power Sources, 2008, vol. 184, pp. 462-468.

* cited by examiner 0.5 μm

CATHODE MATERIAL, NON-AQUEOUS ELECTROLYTE SECONDARY BATTERY CATHODE, AND NON-AQUEOUS ELECTROLYTE SECONDARY BATTERY

CROSS REFERENCE TO RELATED APPLICATION

This application is based on Japanese Patent Application No. 2015-71637 filed on Mar. 31, 2015, the disclosure of which is incorporated herein by reference.

TECHNICAL FIELD

The present disclosure relates to a positive electrode material, a non-aqueous electrolyte secondary battery positive electrode, and a non-aqueous electrolyte secondary battery using the same.

BACKGROUND ART

Electronic devices such as a notebook type computer, a portable phone, and a digital camera are widely used, and thus demands for a secondary battery which is used for driving these electronic devices are increased. Recently, in the electronic devices, consumed power is increased or reduction in size is expected as high functionality progresses. Thus, improvement of performance of the secondary battery is required. Among secondary batteries, in a case of a non-aqueous electrolyte secondary battery (in particular, lithium ion secondary battery), increasing capacity is possible. Thus, the battery has been used in various electronic devices.

Generally, the non-aqueous electrolyte secondary battery has a configuration in which a positive electrode and a negative electrode are connected to each other through a non-aqueous electrolyte (non-aqueous electrolyte liquid) and are stored in a battery case. In the positive electrode, a positive electrode active material layer containing a positive electrode material which is represented as a positive electrode active material is formed on the surface of a positive electrode current collector. In the negative electrode, a negative electrode active material layer having a negative electrode active material is formed on the surface of a negative electrode current collector.

In a lithium ion secondary battery which is the representative example of the non-aqueous electrolyte secondary battery, composite oxide of lithium is used as a positive electrode material (positive electrode active material). Examples of the composite oxide are disclosed in Patent Literatures 1 to 6.

Patent Literature 1 discloses a positive electrode active material obtained by mixing $Li_xCoMO_2$ and $LiNiMnMO_2$ (M: predetermined element which has been selected). The positive electrode active material includes an active material having a high average voltage during discharging, and an active material having high thermal stability.

Patent Literature 2 discloses a positive electrode active material including a crystal layer which has a layered rock salt type structure of $LiNiMnTiO_2$. The positive electrode active material contains Ti, and thus has charging and discharging capacity higher than that in a case of not being contained.

Patent Literature 3 discloses a positive electrode active material obtained by mixing $Li_xMnMO_4$ and $LiNiMO_2$ (M: predetermined element which has been selected). The positive tive electrode active material is excellent in battery performance after preservation at a high temperature.

Patent Literature 4 discloses a positive electrode active material having a layer shape in which a portion of Li in $LiMnMO_2$ having a polycrystalline structure is lacked (M: predetermined element which has been selected). The positive electrode active material causes distortion in crystal or stabilization of chemical bonds to occur. Thus, effects of cycle stability at a time of charging and discharging, durability stability, and the like are obtained.

Patent Literature 5 discloses a positive electrode active material obtained by respectively substituting portions of Li and Co in $LiCoO_2$ with predetermined elements M (M: predetermined element which has been selected). In the positive electrode active material, Li and Co are substituted with elements M, and thus a bonding force between a lithium layer and a cobalt layer is reinforced, and an occurrence of distortion between layers or expansion of a crystal lattice is suppressed. Thus, effects of cycle stability at a time of charging and discharging, durability stability, and the like are obtained.

Patent Literature 6 discloses a positive electrode active material obtained by mixing $LiNiMnCoO_2$ and $Li_2MO_3$ (M: predetermined element which has been selected). The positive electrode active material includes an active material which exhibits an effect of excellent battery capacity and safety, and an active material which exhibits an effect of cycle characteristics and storage characteristics.

However, both of the above positive electrode active materials (positive electrode material) have a problem in that sufficiently suppressing collapse of a crystal structure at a time of charging and discharging is not possible, and reducing capacity of a non-aqueous electrolyte secondary battery is caused.

Non Patent Literature 1 discloses a technology of using a positive electrode containing Ti, that is, $LiNiMnTiO_2$ for safety.

However, a situation in which significant improvement of safety does not occur in a case of adding Ti at about 30% as disclosed in Non Patent Literature 1 occurs.

As another attempt for achieving both of safety and high-stability of crystal, Non Patent Literature 2 discloses a technology of using a positive electrode which contains Si having a high bonding force with oxygen, along with transition metal in the same quantity, that is, using $Li_2MnSiO_4$.

However, since transition metal in the positive electrode has a four-coordinated coordination structure, the structure becomes unstable during charging. Thus, the above positive electrode is also not a positive electrode having sufficient durability.

Patent Literature 7 discloses a positive electrode active material containing Li oxide represented by $Li[Li_xMe_yM'_z]O_{2+d}$ ($x+y+z=1$, $0<x<0.33$, $0.05\leq y\leq 0.15$, $0<d\leq 0.1$, Me: at least one type selected from Mn, V, Cr, Fe, Co, Ni, Al, and B, and M': at least one type selected from Ge, Ru, Sn, Ti, Nb, and Pt).

However, in a battery using this positive electrode active material, improvement of safety is insufficient. Specifically, the addition percentage of an element which is provided in transition metal and is indicated by Me is about 14 at %, and an oxygen atom which is not bound to the element indicated by Me exists. The element indicated by Me and an oxygen atom are strongly bound to each other, and thus breakup (separation of oxygen) of the bonding hardly occurs. That is, oxygen atoms which are included in the positive electrode active material in Patent Literature 7 and are not bound to the element indicated by Me are provided in a form of an oxygen gas, when a battery is formed. Thus, safety of the battery is degraded.

A lithium ion secondary battery (non-aqueous electrolyte secondary battery) has a concern that long-term uses thereof causes a crystal structure in composite oxide of lithium used in a positive electrode active material to be collapsed, and thus contained oxygen is released. In addition, the positive electrode active material has a problem in that the temperature at which oxygen is released is low (breakup of the crystal structure easily occurs if the temperature of the positive electrode active material is increased), and as a result, the safety is degraded.

PRIOR ART LITERATURES

Patent Literatures

Patent Literature 1: JP-2007-188703 A
Patent Literature 2: JP-2008-127233 A
Patent Literature 3: JP-2001-345101 A
Patent Literature 4: JP-2001-250551 A
Patent Literature 5: JP-3782058 B
Patent Literature 6: JP-2006-202702 A
Patent Literature 7: U.S. Pat. No. 8,734,994

Non Patent Literatures

Non Patent Literature 1: Seung-Taek Myung and other 5 authors, "Synthesis of LiNi0.5Mn0.5-xTixO2 by an Emulsion Drying Method and Effect of Ti on Structure and Electrochemical Properties", Chemistry of Materials, 2005, Volume No. 17, P2427-2435

Non Patent Literature 2: R. Dominko "Li2MSiO4 (M=Fe and/or Mn) cathode materials", Journal of Power Sources, 2008, Volume No. 184, P462-P468

SUMMARY

It is an object of the present disclosure to provide a positive electrode material, a non-aqueous electrolyte secondary battery positive electrode, and a non-aqueous electrolyte secondary battery in which collapse of a crystal structure at a time of charging and discharging is suppressed and safety is excellent.

According to a first aspect of the present disclosure, a positive electrode material includes: $Li_2Ni_\alpha M^1_\beta M^2_\gamma Mn_\eta O_{4-\epsilon}$. $\alpha$ satisfies a relational expression of $0.50<\alpha\leq1.33$. $\gamma$ satisfies a relational expression of $0.33\leq\gamma\leq1.1$. $\eta$ satisfies a relational expression of $0\leq\eta\leq1.00$. $\beta$ satisfies a relational expression of $0\leq\beta<0.67$. $\epsilon$ satisfies a relational expression of $0\leq\epsilon\leq1.00$. $M^1$ is at least one type selected from Co and Ga. $M^2$ is at least one type selected from Ge, Sn, and Sb. $Li_2Ni_\alpha M^1_\beta M^2_\gamma Mn_\eta O_{4-\epsilon}$ has a layered structure which includes a Li layer and a Ni layer. A crystal structure of $Li_2Ni_\alpha M^1_\beta M^2_\gamma Mn_\eta O_{4-\epsilon}$ is a superlattice structure.

According to the present disclosure, in the positive electrode material, Ni is contained much in a range of $0.50<\alpha\leq1.33$, and thus high capacity is achieved.

The $M^1$ element and the $M^2$ element are contained much, and thus the crystal structure becomes stable more, collapse of the crystal structure at a time of charging and discharging is suppressed, and as a result, reduction of battery capacity is suppressed. The $M^2$ element strongly fixes oxygen. As a result, separation of oxygen concerned when abnormal heating occurs is suppressed, and thus safety of a battery is improved more. Further, when the amount of the $M^2$ element is equal to or more than 0.33, on average, the total oxygen in the Ni layer is adjacent to the $M^2$ element, and bonding to the $M^2$ element is maintained. Thus, an oxygen separation effect significantly highly occurs.

According to the present disclosure, the positive electrode material has a layered structure which includes a Li layer and a Ni layer. Thus, conductivity of Li ions is excellent.

In addition, the superlattice structure is formed, and thus combination in size of unit lattices and superlattices causes packing properties to be improved, and distortion in crystal is relaxed. Thus, collapse of crystal is suppressed, and a stable crystal structure is formed. That is, a positive electrode material in which generation of oxygen is suppressed is obtained.

According to a second aspect of the present disclosure, a non-aqueous electrolyte secondary battery positive electrode includes: the positive electrode material according to the first aspect.

The non-aqueous electrolyte secondary battery positive electrode uses the positive electrode material according to the present disclosure, and can exhibit the effects obtained by the positive electrode material according to the present disclosure.

According to a third aspect of the present disclosure, a non-aqueous electrolyte secondary battery includes: a non-aqueous electrolyte secondary battery positive electrode made of the positive electrode material according to the first aspect.

The non-aqueous electrolyte secondary battery uses the positive electrode material according to the present disclosure, and can exhibit the effects obtained by the positive electrode material according to the present disclosure.

BRIEF DESCRIPTION OF DRAWINGS

The above and other objects, features and advantages of the present disclosure will become more apparent from the following detailed description made with reference to the accompanying drawings. In the drawings.

EMBODIMENTS

Figure 1:
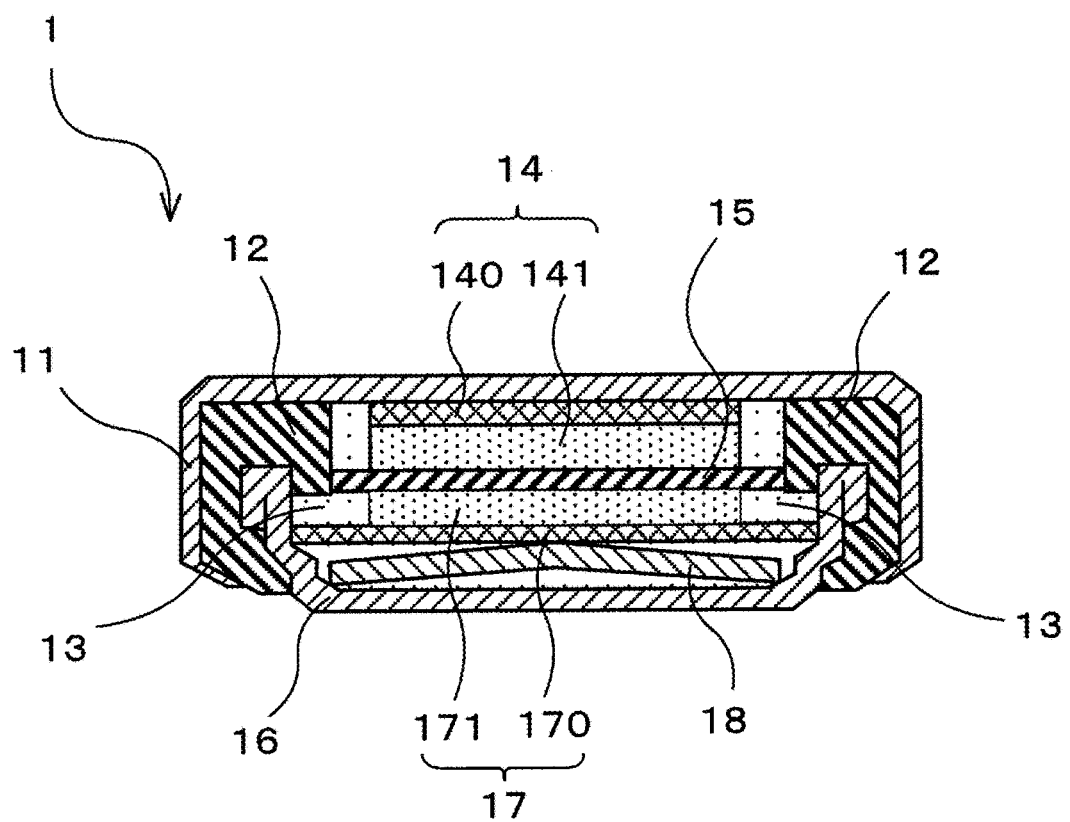
FIG. 1 is a schematic cross-sectional view illustrating a configuration of a coin type lithium ion secondary battery according to an embodiment.

To solve the problem in the related art, the inventors have focused on the structure of a positive electrode material, and found that a positive electrode material which contains many of nickel elements which are strongly bound to oxygen is used, and thus the above problem can be solved.

That is, a positive electrode material in the present disclosure is represented by $Li_2Ni_\alpha M^1_\beta M^2_\gamma Mn_\eta O_{4-\epsilon}$ ($0.50<\alpha\leq1.33$, $0.33\leq\gamma\leq1.1$, $0\leq\eta\leq1.00$, $0\leq\beta<0.67$, $0\leq\epsilon\leq1.00$, $M^1$: at least one type selected from Co and Ga, and $M^2$: at least one type selected from Ge, Sn, and Sb), and has a layered structure which includes a Li layer and a Ni layer. The crystal structure thereof is a superlattice periodic structure.

A non-aqueous electrolyte secondary battery positive electrode in the present disclosure uses the positive electrode material.

A non-aqueous electrolyte secondary battery in the present disclosure uses at least one of a non-aqueous electrolyte secondary battery positive electrode and a non-aqueous electrolyte secondary battery positive electrode which use the positive electrode material.

The positive electrode material in the present disclosure contains Ni in the composition thereof. Ni forms a local structure (six-coordinated local structure) in which oxygen (O) is 6-coordinated. As a result, charging and discharging is stably performed. Ni which is redox species is contained much in a range of $0.50<\alpha\leq1.33$, and thus high capacity is achieved.

The $M^1$ element and the $M^2$ element are contained much, and thus the crystal structure becomes stable more, collapse of the crystal structure at a time of charging and discharging is suppressed, and as a result, reduction of battery capacity is suppressed. The $M^2$ element strongly fixes oxygen. As a result, separation of oxygen concerned when abnormal heating occurs is suppressed, and thus safety of a battery is improved more. Further, when the amount of the $M^2$ element is equal to or more than 0.33, on average, the total oxygen in the Ni layer is adjacent to the $M^2$ element, and bonding to the $M^2$ element is maintained. Thus, an oxygen separation effect significantly highly occurs.

According to the present disclosure, the positive electrode material has a layered structure which includes a Li layer and a Ni layer. Thus, conductivity of Li ions is excellent. The Li layer means a layer formed by using Li as the main component, and is a layer substantially formed by Li. The Ni layer indicates a layer formed by using Ni (Ni compound) as the main component, and is a layer which substantially contains Ni, a $M^1$ element, and a $M^2$ element as the main component.

In the positive electrode material in this form, the crystal structure is a superlattice structure. That is, the superlattice structure is formed, and thus combination in size of unit lattices and superlattices causes packing properties to be improved, and distortion in crystal is relaxed. Thus, collapse of crystal is suppressed, and a stable crystal structure is formed. That is, a positive electrode material in which generation of oxygen is suppressed is obtained.

A non-aqueous electrolyte secondary battery positive electrode and a non-aqueous electrolyte secondary battery in the present disclosure use the positive electrode material in the present disclosure, and can exhibit effects obtained by the positive electrode material in the present disclosure.

The present disclosure will be specifically described in detail by using an embodiment.

[Embodiment]

In an embodiment, a coin type lithium ion secondary battery 1 is provided. The configuration of the lithium ion secondary battery 1 is illustrated in a schematic cross-sectional view in FIG. 1. The lithium ion secondary battery 1 in the embodiment is a secondary battery (non-aqueous electrolyte secondary battery) using a positive electrode (non-aqueous electrolyte secondary battery positive electrode) which has the positive electrode material in the present disclosure as a positive electrode active material.

The lithium ion secondary battery 1 in the embodiment includes a positive electrode case 11, a seal member (gasket) 12, a non-aqueous electrolyte 13, a positive electrode 14, a positive electrode current collector 140, a positive electrode mixture layer 141, a separator 15, a negative electrode case 16, a negative electrode 17, a negative electrode current collector 170, a negative electrode mixture layer 171, a holding member 18, and the like.

The positive electrode 14 of the lithium ion secondary battery 1 in the embodiment includes a positive electrode mixture layer 141 which contains a positive electrode active material formed by a positive electrode material according to the present disclosure. The positive electrode mixture layer 141 includes, if necessary, members such as a binder and a conductive material, in addition to the positive electrode active material.

(Positive Electrode Material)

The positive electrode material is represented by $Li_2Ni_\alpha M^1_\beta M^2_\gamma Mn_\eta O_{4-\varepsilon}$ ($0.50<\alpha\leq1.33$, $0.33\leq\gamma\leq1.1$, $0\leq\eta\leq1.00$, $0\leq\beta0.67$, $0\leq\varepsilon\leq1.00$, $M^1$: at least one type selected from Co and Ga, and $M^2$: at least one type selected from Ge, Sn, and Sb).

The positive electrode material in the embodiment includes Ni (transition metal) in the composition thereof. Regarding Ni, the positive electrode material in the present disclosure includes Ni (transition metal) in the composition thereof. Ni forms a local structure (six-coordinated local structure) in which oxygen (O) is 6-coordinated. As a result, charging and discharging is stably performed. Ni forms a local structure (six-coordinated local structure) in which oxygen (O) is 6-coordinated. Ni which is redox species is contained much in a range of $0.50<\alpha\leq1.33$, and thus high capacity is achieved.

The $M^1$ element and the $M^2$ element are contained much, and thus the crystal structure becomes stable more, collapse of the crystal structure at a time of charging and discharging is suppressed, and as a result, reduction of battery capacity is suppressed. The $M^2$ element strongly fixes oxygen. As a result, separation of oxygen concerned when abnormal heating occurs is suppressed, and thus safety of a battery is improved more. Further, when the amount of the $M^2$ element is equal to or more than 0.33, on average, the total oxygen in the Ni layer is adjacent to the $M^2$ element, and bonding to the $M^2$ element is maintained. Thus, an oxygen separation effect significantly highly occurs.

In a non-aqueous electrolyte secondary battery (lithium ion battery), if overcharging is in progress, fault may occur. Oxygen released from the positive electrode active material (positive electrode material) is largely influenced in the process up to the fault in the battery. Specifically, electrons are taken away from oxygen in the positive electrode active material with charging, and thus oxygen is easily released. In the positive electrode material in the present disclosure, the $M^2$ element is added, and the added $M^2$ element is bound to oxygen stronger than that in a case of Ni or Mn (transition metal). That is, addition of the $M^2$ element can suppress the amount of released oxygen at a time of charging and discharging, to the minimum.

The positive electrode material in the embodiment has a layered structure which includes a Li layer and a Ni layer. With this configuration, the positive electrode material has excellent conductivity for Li ions. The Li layer means a layer formed by using Li as the main component, and is a layer substantially formed by Li. The Ni layer indicates a layer formed by using Ni (Ni compound) as the main component, and is a layer which is substantially formed by using Ni, a $M^1$ element, and a $M^2$ element as the main component. The main component means a component having a largest content percentage.

In the positive electrode material in this form, the crystal structure is a superlattice structure. That is, the superlattice structure is formed, and thus combination in size of unit lattices and superlattices causes packing properties to be improved, and distortion in crystal is relaxed. Thus, collapse of crystal is suppressed, and a stable crystal structure is formed. That is, a positive electrode material in which generation of oxygen is suppressed is obtained.

The positive electrode material in the embodiment is not limited as long as a material has a superlattice structure in the above composition. However, it is preferable that, when a crystal structure thereof is indexed to a space group of C12/m1, the positive electrode material has a periodic structure of three times that when an electron beam is incident from a [1-12] orientation or a [001] orientation, or is incident from the [1-12] orientation and the [001] orientation It is preferable that the positive electrode material has an extra spot or streaks in an electron-beam diffraction pattern. It is more preferable that the extra spot or the streaks can be confirmed in the entirety of the diffraction pattern. The extra spot or streaks have intensity which varies depending on particles. Thus, the entirety of the electron-beam diffraction pattern means the substantially total diffraction pattern obtained by excluding a pattern in which showing the extra spot or streaks is not possible due to defects and the like.

With the above characteristics, the positive electrode material forms a stable crystal structure in which collapse of the crystal structure is suppressed.

Regarding the positive electrode active material, the above positive electrode material may be included as the positive electrode active material, and other positive electrode active materials (positive electrode materials) may be provided. Other positive electrode active materials may be other substances corresponding to the above chemical formula, or may be the other compounds.

(Configuration other than Positive Electrode Active Material)

In the lithium ion secondary battery 1 in the embodiment, the configuration except for using the positive electrode material as the positive electrode active material can be made similarly to the lithium ion secondary battery in the related art.

Regarding the positive electrode 14, the positive electrode current collector 140 is coated with a positive electrode mixture obtained by mixing the positive electrode active material, a conductive material, and a binding material, and thus the positive electrode mixture layer 141 is formed.

The conductive material secures electrical conductivity of the positive electrode 14. As the conductive material, for example, fine particles of graphite, carbon black such as acetylene black, ketjen black, and carbon nanofiber, and fine particles of amorphous carbon such as needle cokes can be used. However, it is not limited thereto.

The binding agent binds positive electrode active material particles or the conductive material. As the binding agent, for example, PVDF, EPDM, SBR, NBR, fluororubber, and the like can be used, but it is not limited thereto.

The positive electrode mixture is dispersed in a solvent, and is applied onto the positive electrode current collector 140. An organic solvent for dissolving the binding agent is generally used as the solvent. Examples of the organic solvent include NMP, dimethylformamide, dimethylacetamide, methyl ethyl ketone, cyclohexanone, methyl acetate, methyl acrylate, diethyl triamine, N-N-dimethylaminopropylamine, ethylene oxide, and tetrahydrofuran, but it is not limited thereto. A dispersion agent, a thickening agent, and the like may be added in water, and thus a slurry of the positive electrode active material by PTFE and the like may be obtained.

Regarding the positive electrode current collector 140, a medium obtained by processing metal such as aluminum and stainless steel, for example, a foil, a net, punched metal, foam metal, and the like which are processed to have a plate shape can be used. However, it is not limited thereto.

(Non-Aqueous Electrolyte)

As the non-aqueous electrolyte 13, an electrolyte in which a supporting salt is dissolved in an organic solvent is used.

The type of the supporting salt in the non-aqueous electrolyte 13 is not particularly limited. However, at least one type among inorganic salts selected from $LiPF_6$, $LiBF_4$, $LiClO_4$, and $LiAsF_6$, derivatives of the inorganic salts, organic salts selected from $LiSO_3CF_3$, $LiC(SO_3CF_3)_3$, $LiN(SO_2CF_3)_2$, $LiN(SO_2C_2F_5)_2$, and $LiN(SO_2CF_3)(SO_2C_4F_9)$, and derivatives of the organic salts is desirable. The supporting salt can cause battery performance to be improved further, and can cause the battery performance to be more highly maintained at a temperature range other than room temperature. The concentration of the supporting salt is not particularly limited, and it is preferable that the concentration of the supporting salt is appropriately selected in accordance with a use, considering the type of the supporting salt and the organic solvent.

The organic solvent (non-aqueous solvent) in which the supporting salt is dissolved is not particularly limited as long as the organic solvent is used in a general non-aqueous electrolyte. For example, carbonates, halogenated hydrocarbons, ethers, ketones, nitriles, lactones, and oxolane compounds can be used as the organic solvent. In particular, for example, propylene carbonate, ethylene carbonate, 1,2-dimethoxyethane, dimethyl carbonate, diethyl carbonate, ethyl methyl carbonate, vinylene carbonate, and solvent mixtures thereof are appropriate. Among the above-exemplified organic solvents, in particular, one or more types of non-aqueous solvents selected from a group consisting of carbonates and ethers are preferable because using the above solvent causes solubility, a dielectric constant, and viscosity of the supporting salt to be excellent, and causes charging and discharging efficiency of a battery to be high.

In the lithium ion secondary battery 1 in the embodiment, a non-aqueous electrolyte 13 which is most preferable is obtained by dissolving the supporting salt in an organic solvent.

(Negative Electrode)

Regarding the negative electrode 17, a negative electrode mixture obtained by mixing a negative electrode active material and a binding agent is applied onto the surface of the negative electrode current collector 170, so as to form the negative electrode mixture layer 171.

The conventional negative electrode active material may be used as the negative electrode active material. A negative electrode active material which contains at least one element of Sn, Si, Sb, Ge, and C may be exemplified. Among the negative electrode active materials, regarding C, a carbon material capable of occluding and releasing electrolyte ions in the lithium ion secondary battery 1 (Li occlusion capacity is provided) is preferable, and amorphous-coat natural graphite is more preferable.

Among the above negative electrode active material, Sn, Sb, and Ge are particularly alloy materials having a volume which is largely changed. The negative electrode active materials may form alloys with another metal like Ti—Si, Ag—Sn, Sn—Sb, Ag—Ge, Cu—Sn, and Ni—Sn.

A carbon material, metal powder, conductive polymer, and the like may be used as the conductive material. From a viewpoint of conductivity and stability, it is preferable that the carbon material such as acetylene black, Ketjen black, and carbon black is used.

Examples of the binding material can include polytetrafluoroethylene (PTFE), polyvinylidene fluoride (PVDF), fluororesin copolymer (tetrafluoroethylene/hexafluoropropylene copolymer) SBR, acrylic rubber, fluorine rubber, polyvinyl alcohol (PVA), styrene/maleic acid resin, polyacrylate, carboxyl methyl cellulose (CMC).

Examples of the solvent can include an organic solvent such as N-methyl-2-pyrrolidone (NMP), and water.

The conventional current collector may be used as the negative electrode current collector 170. A medium obtained by processing metal such as copper, stainless steel, titanium, and nickel, for example, a foil, a net, punched metal, foam metal, and the like which are processed to have a plate shape can be used. However, it is not limited thereto.

(Other Components)

The positive electrode case 11 and the negative electrode case 16 seal built-in components through the insulating seal member 12. The built-in components are the non-aqueous electrolyte 13, the positive electrode 14, the separator 15, the negative electrode 17, the holding member 18, and the like.

The positive electrode mixture layer 141 is in surface-contact with the positive electrode case 11 through the positive electrode current collector 140, and thus the positive electrode mixture layer 141 and the positive electrode case 11 are electrically connected. The negative electrode mixture layer 171 is in surface-contact with the negative electrode case 17 through the negative electrode current collector 170.

The separator 15 interposed between the positive electrode mixture layer 141 and the negative electrode mixture layer 171 electrically insulates the positive electrode mixture layer 141 and the negative electrode mixture layer 171 from each other, and the separator 15 holds the non-aqueous electrolyte 13. The separator 15 uses, for example, a porous synthetic resin film, particularly, uses a porous film of polyolefin polymer (polyethylene, polypropylene). The separator 15 is formed to have dimensions larger than that of the mixture layers 141 and 171, in order to secure electrical insulating between the two mixture layers 141 and 171.

The holding member 18 functions to hold the positive electrode current collector 140, the positive electrode mixture layer 141, the separator 15, the negative electrode mixture layer 171, and the negative electrode current collector 170 to be positioned at right positions. If an elastic member such as an elastic piece or a spring is used, holding at the right positions is easily performed.

Other Embodiments

The lithium ion secondary battery 1 in the embodiment has a coin type shape as described above. However, the shape thereof is not particularly limited, and batteries having various shapes such as a cylindrical type and a square type or a battery having an amorphous shape which is sealed by a laminate exterior member may be provided.

(Manufacturing Method)

The manufacturing method of the positive electrode material in the embodiment is not limited as long as the positive electrode material has the above configuration. Examples of the manufacturing method can include a solid phase synthesis method, a coprecipitation synthesis method, a hydrothermal synthesis method, a complex polymerization synthesis method, a method through ion exchange, a synthesis method by high-temperature and high-pressure treatment, a sol-gel method, a spray dry method, and a supercritical synthesis method. A method of singly using the above methods, or a method of using a combination of multiple methods can be exemplified.

EXAMPLES

The present disclosure will be described below by using examples.

As examples for specifically describing the present disclosure, a positive electrode material (positive electrode active material), and a positive electrode and a lithium ion secondary battery which used the positive electrode material were manufactured. In the examples, a lithium ion secondary battery illustrated in FIG. 1 was manufactured.

Example 1

Figure 2:
FIG. 2 is a TEM picture of a positive electrode material in Example 1.
Figure 3B:
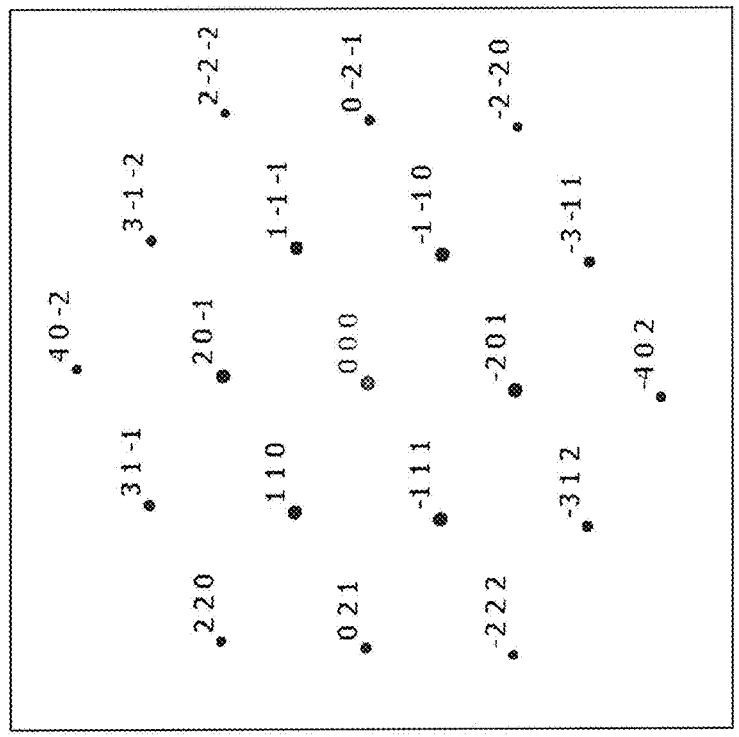
FIGS. 3A and 3B illustrate a measurement result and an analysis result of an electron-beam diffraction pattern when an electron beam is incident from a [1-12] orientation of the positive electrode material in Example 1.
Figure 3A:
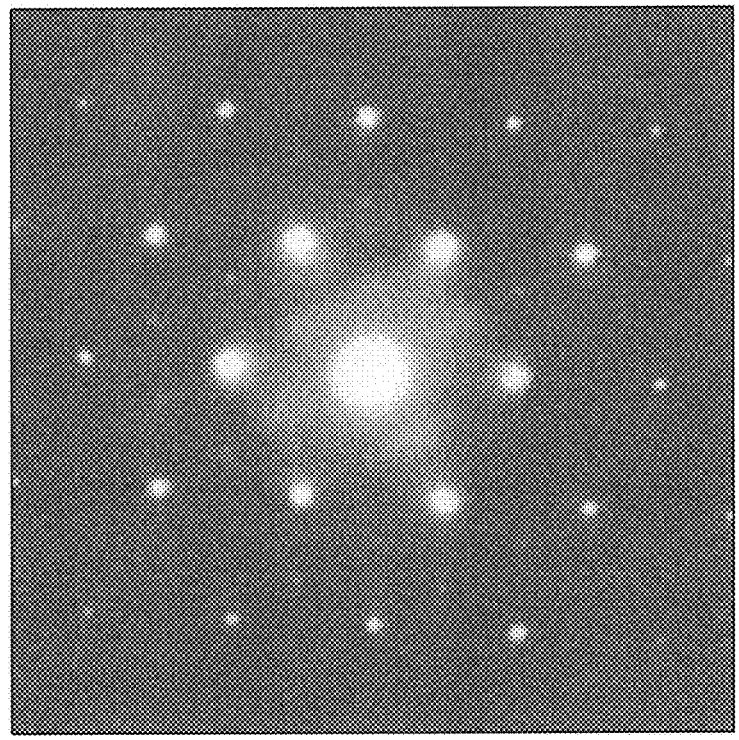
Figure 4B:
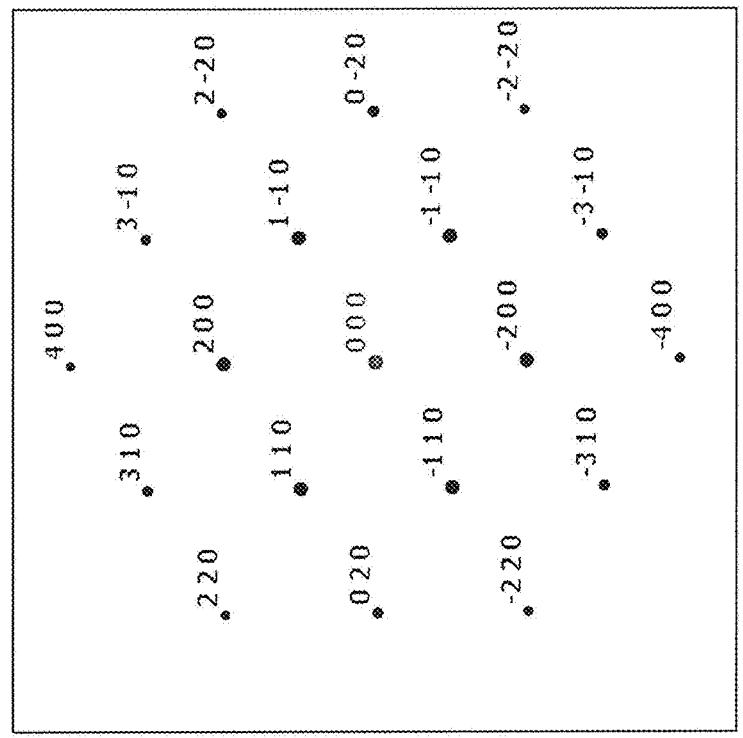
FIGS. 4A and 4B illustrate a measurement result and an analysis result of an electron-beam diffraction pattern when an electron beam is incident from a [001] orientation of the positive electrode material in Example 1.
Figure 4A:
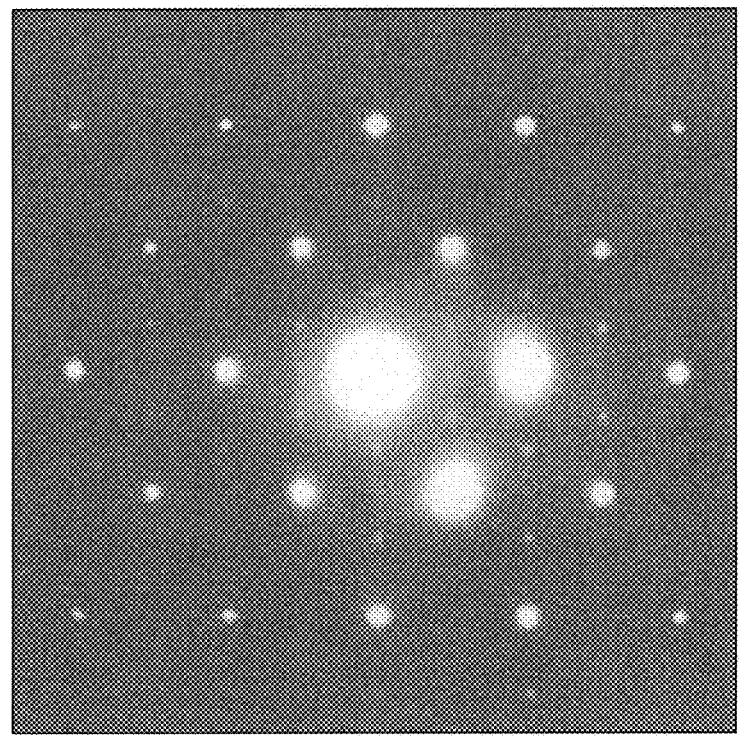

A positive electrode material in this example is $Li_2NiGeO_4$ powder. The composition was confirmed by ICP analysis. If the $Li_2NiGeO_4$ powder which is the positive electrode material in this example was observed by powder XRD, it was confirmed that the $Li_2NiGeO_4$ powder was a substantially single-phase compound, and had a layered rock salt type crystal structure. The superlattice structure was confirmed by capturing a TEM picture and an electron-beam diffraction pattern. As illustrated in FIG. 2, in the positive electrode material in Example 1, it can be confirmed that primary particles of about 100 nm to several μm form polycrystal. FIG. 2 illustrates a TEM image having magnification of 32,000.

The positive electrode material in Example 1 has an electron-beam diffraction pattern as in FIGS. 3A to 4B.

Regarding measurement results illustrated in FIGS. 3A to 4B, a crystal structure was indexed to a crystal structure. As a result, it is confirmed that the positive electrode material in Example 1 is monoclinic and has a crystal structure belonging to C12/m1. From FIGS. 3A and 3B, triple periodicity of a (31-1) plane and a (3-1-2) plane can be confirmed when an electron beam is incident from the [1-12] orientation. From FIGS. 4A and 4B, triple periodicity of a (020) plane and a (310) plane can be confirmed when an electron beam is incident from the [001] orientation. Thus, the positive electrode material in Example 1 has a superlattice structure of triple period when a crystal structure is indexed to C12/m1. In FIGS. 3A to 4B, streaks and an extra spot can be confirmed. The composition and the confirmation of a superlattice structure are similarly applied to the following examples.

Example 2

Similarly to Example 1, a positive electrode material ($Li_2NiSnO_4$ powder) in this example was prepared. The positive electrode material has a superlattice structure in which triple periodicity when an electron beam is incident from the [1-12] orientation and the [001] orientation belonging to a crystal structure which is monoclinic and has C12/m1 can be confirmed from an electron-beam diffraction pattern.

Example 3

Similarly to Example 1, a positive electrode material ($Li_2NiMn_{0.33}Ge_{0.67}O_4$ powder) in this example was prepared. The positive electrode material has a superlattice structure in which triple periodicity when an electron beam is incident from the [1-12] orientation and the [001] orientation belonging to a crystal structure which is monoclinic and has C12/m1 can be confirmed from an electron-beam diffraction pattern.

Example 4

Similarly to Example 1, a positive electrode material ($Li_{2.1}NiMn_{0.67}Sn_{0.33}O_4$ powder) in this example was prepared. The positive electrode material has a superlattice structure in which triple periodicity when an electron beam is incident from the [1-12] orientation and the [001] orientation belonging to a crystal structure which is monoclinic and has C12/m1 can be confirmed from an electron-beam diffraction pattern.

Example 5

Similarly to Example 1, a positive electrode material ($Li_{2.1}Ni_{0.67}Co_{0.67}Mn_{0.33}Ge_{0.33}O_4$ powder) in this example was prepared. The positive electrode material has a superlattice structure in which triple periodicity when an electron beam is incident from the [001] orientation belonging to a crystal structure which is monoclinic and has C12/m1 can be confirmed from an electron-beam diffraction pattern.

Comparative Example 1

Aqueous solutions containing metal complexes of Li and Ni were respectively prepared, and the obtained complex solutions were mixed so as to have a desired composition ratio (atom ratio of Li:Ni is 1:1) of a positive electrode material. The obtained solution mixture was dried in a dry furnace and an organic component was removed by heating treatment. Then, heating and baking was performed.

With the above descriptions, a positive electrode material ($LiNiO_2$ powder) in this example was manufactured.

[Evaluation]

For evaluation of each of the above examples, a lithium ion secondary battery was assembled, and charging and discharging characteristics were evaluated. After the charging and discharging characteristics were measured, the coin type battery was disassembled, and a positive electrode was extracted. Then, safety was evaluated.

(Lithium Ion Secondary Battery)

A test cell (2032 type coin type half cell) formed by a lithium ion secondary battery was assembled by using the positive electrode active material in each of the above examples, and evaluation was performed.

(Coin Type Half Cell)

The test cell (coin-type half cell) has a configuration similar to the coin type lithium ion secondary battery 1 of which the configuration is illustrated in FIG. 1.

Regarding a positive electrode, 91 parts by mass of a positive electrode active material (positive electrode active material in each of the examples), 2 parts by mass of acetylene black, and 7 parts by mass of PVDF were mixed to each other. A positive electrode current collector 140 formed by an aluminum foil was coated with the obtained positive electrode mixture, so as to form a positive electrode mixture layer 141. A positive electrode obtained in this manner was used.

Lithium (metal) was used in a negative electrode (counter electrode). The negative electrode corresponds to the negative electrode mixture layer 171 in FIG. 1.

30 volume % of ethylene carbonate (EC) and 70 volume % of diethyl carbonate (DEC) were mixed to each other. $LiPF_6$ was dissolved and prepared in the obtained solvent mixture so as to have 1 mol/litre. The resultant of the preparation was used as the non-aqueous electrolyte 13.

The test cell was assembled, and then, activation treatment was performed by charging and discharging at a cycle of 1/3C×2.

With the above descriptions, the test cell (half cell) in the examples was prepared.

[Charging and Discharging Characteristics]

Charging and discharging of a lithium ion secondary battery was performed at a rate of 1/50 C. Charging was performed by CC charging at 4.5 V cut, and discharging was performed by CC discharging at 2.6 V. The charging and discharging was respectively performed for 10 cycles.

Table 1 shows measurement results of charging capacity and discharging capacity of the lithium ion secondary battery in each of the examples (Examples 1 to 5 and Comparative Example 1). In Table 1, the proportions when charging capacity and discharging capacity of the lithium ion secondary battery in Comparative Example 1 are set to 100% are shown.

TABLE 1

| | Positive Electrode material Chemical expression | Battery evaluation | | | |
|---|---|---|---|---|---|
| | | Charging capacity (mAh/g) | Discharging capacity (mAh/g) | Cycle characteristics (after 10 cycles) (%) | Safety test amount of generated oxygen (%) |
| Example 1 | $Li_2NiGeO_4$ | 152 | 141 | 99.1 | 0.58 |
| Example 2 | $Li_2NiSnO_4$ | 140 | 120 | 98.8 | 0.47 |
| Example 3 | $Li_{2.1}NiMn_{0.67}Ge_{0.33}O_4$ | 170 | 155 | 98.6 | 0.49 |
| Example 4 | $Li_{2.1}NiMn_{0.67}Sn_{0.33}O_4$ | 152 | 140 | 98.9 | 0.62 |
| Example 5 | $Li_{2.1}Ni_{0.67}Co_{0.67}Mn_{0.33}Ge_{0.33}O_4$ | 180 | 161 | 99.8 | 0.71 |
| Comparative Example 1 | $LiNiO_2$ | 170 | 155 | 94.6 | 8.94 |

As shown in Table 1, the secondary battery in each of the examples has excellent charging capacity and discharging capacity in comparison to that in Comparative Example 1.

That is, it is confirmed that the secondary battery in each of the examples has good charging and discharging characteristics.

[Safety Test]

Charging of the lithium ion secondary battery was performed to 4.5 V at a rate of 1/50 C by CC charging.

After the charging was completed, the battery was separated, and a positive electrode was extracted.

The extracted positive electrode was washed in a DMC, and then was heated from room temperature to 1000° C. at a rising rate of 20° C./min under a helium atmosphere. At this time, the amount of oxygen generated from the positive electrode was measured by TPD-MS measurement.

Measurement results are shown in Table 1 in combination.

As shown in Table 1, it is understood that the amount of the generated oxygen is 8.94% and high in Comparative Example 1. It is understood that the amount of the generated oxygen is equal to or less than 1% (0.71% at the maximum) and small in each of the examples.

That is, it is understood that the secondary battery in which the amount of the generated oxygen is small and safety is excellent is obtained by using the positive electrode material (positive electrode) in each of the examples.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A positive electrode material comprising:
$Li_2Ni_\alpha M^1_\beta M^2_\gamma Mn_\eta O_{4-\epsilon}$, wherein
$\alpha$ satisfies a relational expression of $0.50 < \alpha \leq 1.33$;
$\gamma$ satisfies a relational expression of $0.33 \leq \gamma \leq 1.1$;
$\eta$ satisfies a relational expression of $0 \leq \eta \leq 1.00$;
$\beta$ satisfies a relational expression of $0 < \beta < 0.67$;
$\epsilon$ satisfies a relational expression of $0 \leq \epsilon \leq 1.00$;
$M^1$ is at least one type selected from Co and Ga;
$M^2$ is at least Ge;
$Li_2Ni_\alpha M^1_{62} M^2_{65} Mn_\eta O_{4-\epsilon}$ has a layered structure which includes a Li layer and a Ni layer; and
a crystal structure of $Li_2Ni_\alpha M^1_\beta M^2_{65} Mn_\eta O_{4-\epsilon}$ is a superlattice structure.

2. The positive electrode material according to claim 1, wherein:
$Li_2Ni_\alpha M^1_\beta M^2_{65} Mn_\eta O_{4-\epsilon}$ has a three-fold superlattice periodic structure when an electronic beam is incident from a [1-12] orientation in a case where the crystal structure is indexed to a space group of C12/ml.

3. The positive electrode material according to claim 1, wherein:
$Li_2Ni_\alpha M^1_\beta M^2_{65} Mn_\eta O_{4-\epsilon}$ has a three-fold superlattice periodic structure when an electronic beam is incident from a [001] orientation in a case where the crystal structure is indexed to a space group of C12/ml.

4. The positive electrode material according to claim 1, wherein:
$Li_2Ni_\alpha M^1_\beta M^2_{65} Mn_\eta O_{4-\epsilon}$ has an extra spot or a streak in an electron-beam diffraction pattern in a case where the crystal structure is indexed to a space group of C12/ml.

5. A non-aqueous electrolyte secondary battery positive electrode comprising:
the positive electrode material according to claim 1.

6. A non-aqueous electrolyte secondary battery comprising:
a non-aqueous electrolyte secondary battery positive electrode made of the positive electrode material according to claim 1.

7. A positive electrode material comprising: $Li_2Ni_\alpha M^1_\beta M^2_{65} Mn_\eta O_{4-\epsilon}$, wherein
$\alpha$ satisfies a relational expression of $0.50 < \alpha \leq 1.33$;
$\gamma$ satisfies a relational expression of $0.33 \leq \gamma \leq 1.1$;
$\eta$ satisfies a relational expression of $0 \leq \eta \leq 1.00$;
$\beta$ satisfies a relational expression of $0 < \beta < 0.67$;
$\epsilon$ satisfies a relational expression of $0 \leq \epsilon \leq 1.00$;
$M^1$ is at least one type selected from Co and Ga;
$M^2$ is at least Sb;
$Li_2Ni_\alpha M^1_\beta M^2_{65} Mn_\eta O_{4-\epsilon}$ has a layered structure which includes a Li layer and a Ni layer; and
a crystal structure of $Li_2Ni_\alpha M^1_\beta M^2_{65} Mn_\eta O_{4-\epsilon}$ is a superlattice structure.

8. The positive electrode material according to claim 7, wherein:
$Li_2Ni_\alpha M^1_\beta M^2_{65} Mn_\eta O_{4-\epsilon}$ has a three-fold superlattice periodic structure when an electronic beam is incident from a [1-12] orientation in a case where the crystal structure is indexed to a space group of C12/ml.

9. The positive electrode material according to claim 7, wherein:
$Li_2Ni_\alpha M^1_\beta M^2_{65} Mn_\eta O_{4-\epsilon}$ has a three-fold superlattice periodic structure when an electronic beam is incident from a [001] orientation in a case where the crystal structure is indexed to a space group of C12/ml.

10. The positive electrode material according to claim 7, wherein:
$Li_2Ni_\alpha M^1_\beta M^2_{65} Mn_\eta O_{4-\epsilon}$ has an extra spot or a streak in an electron-beam diffraction pattern in a case where the crystal structure is indexed to a space group of C12/ml.

11. A non-aqueous electrolyte secondary battery positive electrode comprising:
the positive electrode material according to claim 7.

12. A non-aqueous electrolyte secondary battery comprising:
a non-aqueous electrolyte secondary battery positive electrode made of the positive electrode material according to claim 7.

* * * * *